US012562090B2

(12) United States Patent
Tayuki

(10) Patent No.: US 12,562,090 B2
(45) Date of Patent: Feb. 24, 2026

(54) IMAGE PROCESSING APPARATUS, IMAGE PROCESSING METHOD, AND NON-TRANSITORY COMPUTER-READABLE STORAGE MEDIUM

(71) Applicant: SEIKO EPSON CORPORATION, Tokyo (JP)

(72) Inventor: Kazushige Tayuki, Nagano (JP)

(73) Assignee: Seiko Epson Corporation, Tokyo (JP)

(*) Notice: Subject to any disclaimer, the term of this patent is extended or adjusted under 35 U.S.C. 154(b) by 150 days.

(21) Appl. No.: 18/424,942

(22) Filed: Jan. 29, 2024

(65) Prior Publication Data

US 2024/0257688 A1 Aug. 1, 2024

(30) Foreign Application Priority Data

Jan. 30, 2023 (JP) ................................ 2023-011625

(51) Int. Cl.
*G09G 3/20* (2006.01)

(52) U.S. Cl.
CPC ... *G09G 3/2003* (2013.01); *G09G 2320/0666* (2013.01); *G09G 2354/00* (2013.01)

(58) Field of Classification Search
CPC ....... G09G 2320/0666; G09G 2354/00; G09G 3/2003
See application file for complete search history.

(56) References Cited

U.S. PATENT DOCUMENTS

2004/0085327 A1* 5/2004 Jones .................. G09B 29/006 345/591
2010/0185624 A1* 7/2010 Wang ................. G06F 16/5838 707/E17.084
2012/0147163 A1* 6/2012 Kaminsky ............. G09G 5/028 345/590
2013/0019208 A1* 1/2013 Kotler .................. G06F 3/0488 715/835
2016/0365017 A1* 12/2016 Park ..................... G06F 3/0488

FOREIGN PATENT DOCUMENTS

JP 2009-206572 A 9/2009

OTHER PUBLICATIONS

Wu, “3 Methods to Design for Color Blindness”, downloaded @ https://medium.com/@wenjunwu/3-methods-to-design-for-color-blindness-6be4bdc88094, Jul. 26, 2018 (Year: 2018).*

* cited by examiner

*Primary Examiner* — Yingchun He
(74) *Attorney, Agent, or Firm* — Spencer Fane LLP

(57) ABSTRACT

An image processing apparatus according to an aspect of the present disclosure includes an acquisition unit acquiring image data, a display unit displaying the acquired image data, a receiving unit receiving an instruction to edit the image data displayed by the display unit from a user, and an output unit outputting the image data edited according to the instruction by the user. The display unit distinguishably displays pixels corresponding to a specific color within a color space according to a type of color weakness of the user when displaying the image data.

15 Claims, 8 Drawing Sheets

IMAGE PROCESSING APPARATUS, IMAGE PROCESSING METHOD, AND NON-TRANSITORY COMPUTER-READABLE STORAGE MEDIUM

The present application is based on, and claims priority from JP Application Serial Number 2023-011625, filed Jan. 30, 2023, the disclosure of which is hereby incorporated by reference herein in its entirety.

BACKGROUND

1. Technical Field

The present disclosure relates to an image processing apparatus, an image processing method, and a non-transitory computer-readable storage medium.

2. Related Art

Recently, with the widespread use of digital equipment including digital cameras and smartphones, opportunities for users themselves to edit image data using personal computers, smartphones, etc. have been increased.

Now, it is harder for color-weak people having defective color vision to distinguish colors than for normal people. Further, there are various types of color-weak people. For example, CUDO (Incorporated NPO Color Universal Design Organization) classifies the types of color vision as follows.

C-type: non color blind

P-type: red cone cells defective, red-green blind

D-type: green cone cells defective, red-green blind

T-type: blue cone cells defective, yellow-blue blind

A-type: total color blind

JP-A-2009-206572 discloses a technique of generating an image while keeping information of colors used for intended emphasis by a data creator creating input data by placing color representation information so that even color-weak people may distinguish the colors in the emphasized areas of the input data.

As described above, recently, with the widespread use of digital equipment including digital cameras and smartphones, opportunities for users themselves to edit image data have been increased. Accordingly, an image processing apparatus, an image processing method, and a non-transitory computer-readable storage medium that enable even color-weak people to easily edit image data are required.

SUMMARY

An image processing apparatus according to an aspect of the present disclosure includes an acquisition unit acquiring image data, a display unit displaying the acquired image data, a receiving unit receiving an instruction to edit the image data displayed by the display unit from a user, and an output unit outputting the image data edited according to the instruction by the user, and the display unit distinguishably displays pixels corresponding to a specific color within a color space according to a type of color weakness of the user when displaying the image data.

An image processing method according to an aspect of the present disclosure includes acquiring image data, displaying the acquired image data, receiving an instruction to edit the displayed image data from a user, and outputting the image data edited according to the instruction by the user, and distinguishably displays pixels corresponding to a specific color within a color space according to a type of color weakness of the user when displaying the image data.

A non-transitory computer-readable storage medium according to an aspect of the present disclosure stores a program for a computer to execute image processing including acquiring image data, displaying the acquired image data, receiving an instruction to edit the displayed image data from a user, and outputting the image data edited according to the instruction by the user, and distinguishably displays pixels corresponding to a specific color within a color space according to a type of color weakness of the user when displaying the image data.

DESCRIPTION OF EMBODIMENTS

As below, an embodiment of the present disclosure will be explained with reference to the drawings.

Figure 1:
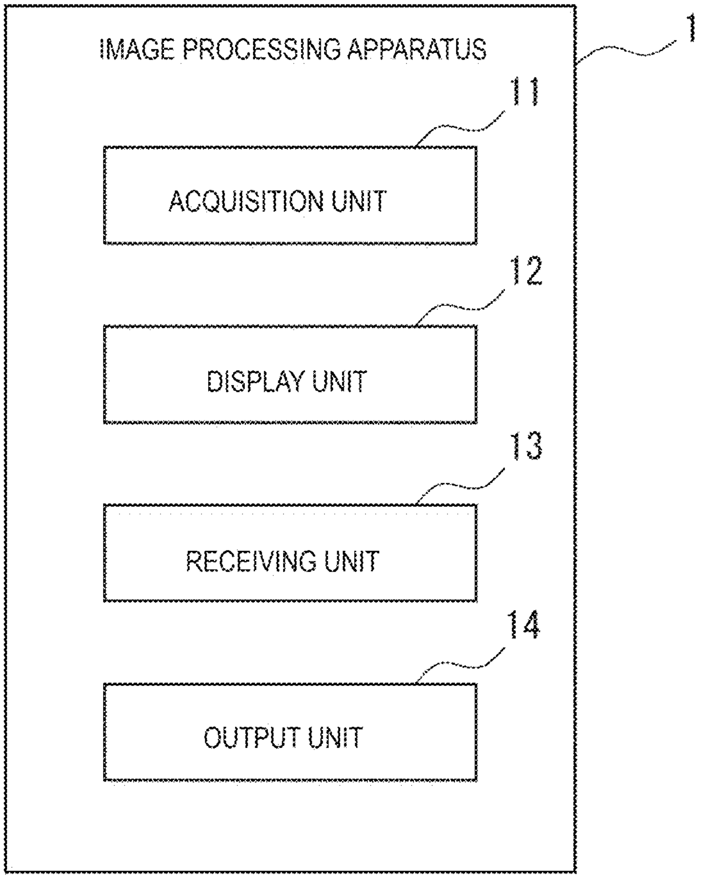
FIG. 1 is a block diagram for explanation of an example of an image processing apparatus according to an embodiment.

FIG. 1 is a block diagram for explanation of an example of an image processing apparatus according to the embodiment. As shown in FIG. 1, an image processing apparatus 1 according to the embodiment includes an acquisition unit 11, a display unit 12, a receiving unit 13, and an output unit 14.

The image processing apparatus 1 according to the embodiment is an electronic apparatus, such as a personal computer or a smartphone, and a user edits image data by operating while viewing an operation window displayed by the display unit 12. Further, the image processing apparatus 1 according to the embodiment may be provided in a printer. In this case, the user may edit image data by operating while viewing an operation window displayed by the display unit 12 and print the edited image data. Note that the image processing apparatus 1 according to the embodiment is not limited to those, but any electronic apparatus with which the user can edit image data displayed by the display unit 12.

The acquisition unit 11 shown in FIG. 1 acquires image data. Specifically, the acquisition unit 11 acquires image data to be edited by the user. In the embodiment, the image data is typically photo data. The acquisition unit 11 may acquire image data stored in a memory unit provided inside of the image processing apparatus 1. Or, the acquisition unit 11 may acquire image data stored in an electronic apparatus outside of the image processing apparatus 1. For example, the acquisition unit 11 may acquire image data stored in a cloud storage via a network line.

The display unit 12 displays the image data acquired by the acquisition unit 11. The display unit 12 is a controller controlling e.g., a liquid crystal panel, an organic EL panel, or the like. The display unit 12 may display the image data by a mechanism provided inside of the image processing apparatus 1 or a mechanism provided outside of the image processing apparatus 1. For example, when the image processing apparatus 1 is configured using a smartphone, the display unit 12 displays the image data by a liquid crystal panel, an organic EL panel, or the like provided inside of the image processing apparatus 1. On the other hand, when the image processing apparatus 1 is configured using a personal computer, the display unit 12 displays the image data by a liquid crystal panel, an organic EL panel, or the like provided outside of the main body of the image processing apparatus 1. Or, the display unit 12 may be a projector and project and display the image data on a screen or the like.

The receiving unit 13 receives an instruction to edit the image data displayed by the display unit 12 from the user. For example, the user edits the image data by operating while viewing an operation window displayed by the display unit 12. The receiving unit 13 receives information on the instruction to edit operated by the user. For example, when the image processing apparatus 1 is a smartphone, the receiving unit 13 receives the instruction to edit input by the user using a touch panel. Or, when the image processing apparatus 1 is a personal computer, the receiving unit 13 receives the instruction to edit input by the user using a mouse or a keyboard.

The output unit 14 outputs the image data edited according to the instruction by the user. For example, the output unit 14 may output and store the edited image data in the memory unit provided inside of the image processing apparatus 1. Or, the output unit 14 may output and store the edited image data in a memory unit of an external electronic apparatus. For example, the output unit 14 may output and store the edited image data in a cloud storage. Or, the output unit 14 may print out the edited image data by printing using a printing mechanism.

In the image processing apparatus 1 according to the embodiment, for even a color-weak person to easily edit image data, when displaying image data, the display unit 12 distinguishably displays pixels corresponding to a specific color within a color space according to a type or an extent of color weakness of the user. The color space includes an RGB color space, an HSV color space, a CMY color space, or the like.

For example, when the type of the color weakness of the user is the P (Protanope)-type or the D (Deuteranope)-type, a combination of the colors hard for the user to distinguish is a combination of reddish and greenish colors. Therefore, reddish and greenish colors highly likely to be hard to distinguish in an arbitrary image are designated as specific colors. In this case, when displaying the image data, the display unit 12 distinguishably displays pixels of reddish and greenish colors as the specific colors. Or, when the type of color weakness of the user is the T (Tritanope)-type, the combination of the colors hard for the user to distinguish is a combination of bluish and yellowish colors. Therefore, bluish and yellowish colors highly likely to be hard to distinguish in an arbitrary image are designated as specific colors. In this case, when displaying the image data, the display unit 12 distinguishably displays pixels of bluish and yellowish colors as the specific colors. In addition, a specific color may be also designated according to the level of the color weakness of the user. That is, for a user who is able to distinguish higher chroma colors, but not able to distinguish lower chroma colors, the lower chroma colors may be designated as specific colors and the higher chroma colors may not be designated as specific colors.

For example, when distinguishably displaying the pixels corresponding to the specific colors within the color space according to the type of the color weakness of the user, the display unit 12 may display the pixels corresponding to the specific colors with blinking. Or, when distinguishably displaying the pixels corresponding to the specific colors within the color space according to the type of the color weakness of the user, the display unit 12 may display the pixels corresponding to the specific colors by surrounding an area containing the pixels with a line.

In the embodiment, the receiving unit 13 may receive information on the color weakness of the user. Here, the information on the color weakness of the user refers to information on a type and a grade of the color weakness of the user. The information on the type of the color weakness of the user is information of the above-described C-type, P-type, D-type, T-type. The information on the grade of the color weakness of the user is information is information on an extent of the color weakness of the user, i.e., information on a level of the color weakness of the user. For example, the receiving unit 13 may receive information on the color weakness of the user using a test pattern that specifies the type of the color weakness of the user. Or, the receiving unit 13 may receive information on the color weakness of the user by the user inputting information on the type and the grade of the color weakness in a predetermined setting window. The display unit 12 distinguishably displays pixels corresponding to specific colors within a color space according to the type and the grade of color weakness of the user acquired in the above-described manner.

In the embodiment, when the specific color hard for the user to distinguish determined based on the type of the color weakness of the user is designated, the display unit 12 may distinguishably display pixels corresponding to the specific color. In this regard, when the pixel corresponding to the color distinguishable by the user determined based on the type of the color weakness of the user is designated, the display unit 12 may maintain the same display as the display for a non color blind person with respect to the designated pixel. In other words, the display unit 12 may distinguishably display pixels corresponding to the specific color only when the specific color hard for the user to distinguish is designated.

As below, specific examples of edit windows of the image processing apparatus according to the embodiment will be explained using FIGS. 2 to 8.

FIGS. 2 to 8 show the specific examples of the edit windows of the image processing apparatus according to the embodiment. The edit windows 21_1 to 21_2, 22_1 to 22_3, 23_1 to 23_2 in FIGS. 2 to 8 show examples of the edit windows displayed by the display unit 12. In the edit windows displayed in FIGS. 2 to 8, image data 31 to be edited and edit tools 32, 33, 34 are displayed, and the image data 31 to be edited is edited by the user operating the edit tools 32, 33, 34. As below, as an example, a case where the image data 31 to be edited contains red petals 41 and green leaves 42 will be explained.

Figure 2:
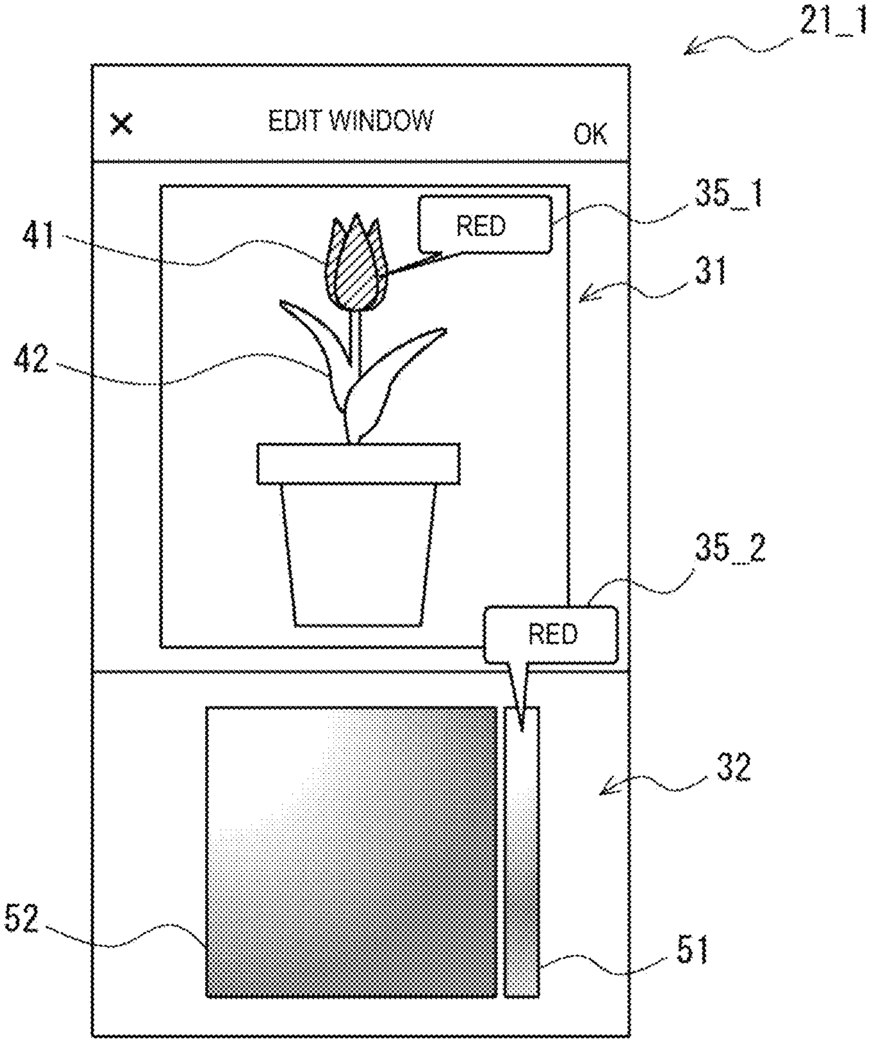
FIG. 2 shows a specific example of an edit window of the image processing apparatus according to the embodiment.
Figure 3:
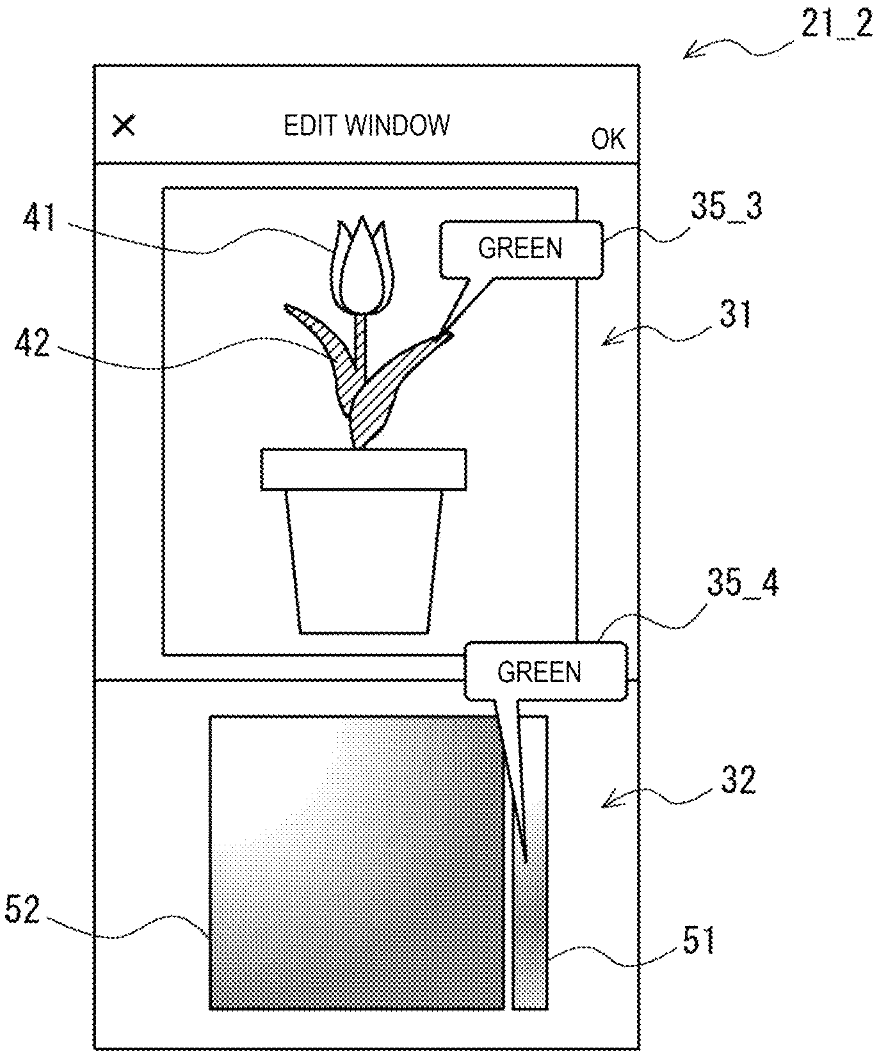
FIG. 3 shows a specific example of the edit window of the image processing apparatus according to the embodiment.

In the examples shown in FIGS. 2, 3, the edit tool 32 includes a one-dimensional hue bar 51 for tuning of hue and a two-dimensional palette 52 in which value and chroma change within the same hue. The receiving unit 13 receives an instruction to tune the specific color within the color space input by the user operating the hue bar 51 and the two-dimensional palette 52.

The hue bar 51 represents hue by one-dimensional gradation and the hue changes in the upward and downward directions. The two-dimensional palette 52 represents the value and the chroma in the hue selected in the hue bar 51 by gradation. In the two-dimensional palette 52, the gradation of the chroma is shown in the lateral directions, and a more achromatic color is shown toward the leftward direction and a higher chroma color is shown toward the rightward direction. The gradation of the value is shown in the longitudinal directions of the two-dimensional palette 52.

As shown in FIG. 2, the image data 31 to be edited includes the red petals 41 and the green leaves 42 and, when the type of the color weakness of the user is the P-type or the D-type, it is hard for the user to distinguish the color of the petals 41 and the color of the green leaves 42. In this case, in the embodiment, when the image data 31 and the edit tool 32 are displayed, pixels of the colors of red and green as the specific colors are distinguishably displayed.

For example, as shown in FIGS. 2 and 3, a tooltip 35_2 showing color information of red and a tooltip 35_4 showing color information of green are displayed in the hue bar 51. For the names of color information, e.g., JIS custom color names may be used. When the user is a color-weak person, distinction of the colors in the hue directions is hard, and, as shown in FIGS. 2, 3, tooltips of a combination of colors hard for the user to distinguish are displayed in the hue bar 51. On the other hand, the two-dimensional palette 52 shows the value and the chroma in the hue selected in the hue bar 51 and the user can recognize the value and the chroma, therefore it is not necessary to display a tooltip showing the color information in the two-dimensional palette 52. Note that, in consideration of the convenience of the user, a tooltip showing the color information may be displayed in the two-dimensional palette 52.

For example, as shown in FIG. 2, when the user selects the position of red in the hue bar 51, the display unit 12 displays the tooltip 35_2 showing the color information of red in the hue bar 51. Here, the display unit 12 distinguishably displays the red part contained in the image data 31, i.e., the part of the petals 41. For example, the display unit 12 may display the pixels of the part of the petals 41 with blinking. Or, the display unit 12 may display the pixels of the part of the petals 41 by surrounding an area containing the pixels with a line. In FIG. 2, as an example, the part of the petals 41 is shown with hatching. Further, the unit may display a tooltip 35_1 showing the color information of red in the part of the petals 41. Note that, in the embodiment, the tooltip may be displayed and the color information may be read by voice.

Furthermore, as shown in FIG. 3, when the user selects the position of green in the hue bar 51, the display unit 12 displays the tooltip 35_4 showing the color information of green in the hue bar 51. Here, the display unit 12 distinguishably displays the green part contained in the image data 31, i.e., the part of the leaves 42. For example, the display unit 12 may display the pixels of the part of the leaves 42 with blinking. Or, the display unit 12 may display the pixels of the part of the leaves 42 by surrounding an area containing the pixels with a line. In FIG. 3, as an example, the part of the leaves 42 is shown with hatching. Note that, in FIG. 3, the color of the stem is also green and the part of the stem is shown with hatching. Further, the unit may display a tooltip 35_3 showing the color information of green in the part of the leaves 42.

Furthermore, in the embodiment, the tooltip 35_2 showing the color information of red and the tooltip 35_4 showing the color information of green may be displayed at the same time in the hue bar 51 shown in FIGS. 2, 3.

Figure 4:
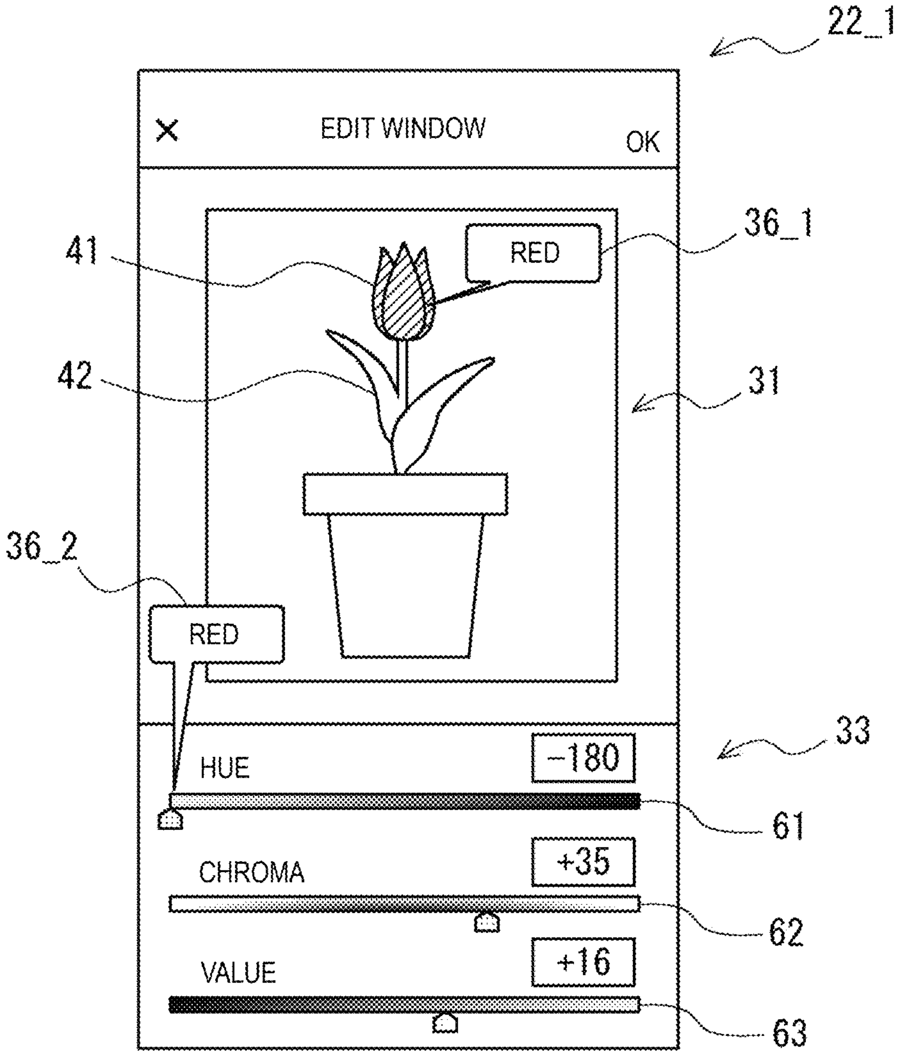
FIG. 4 shows a specific example of an edit window of the image processing apparatus according to the embodiment.
Figure 5:
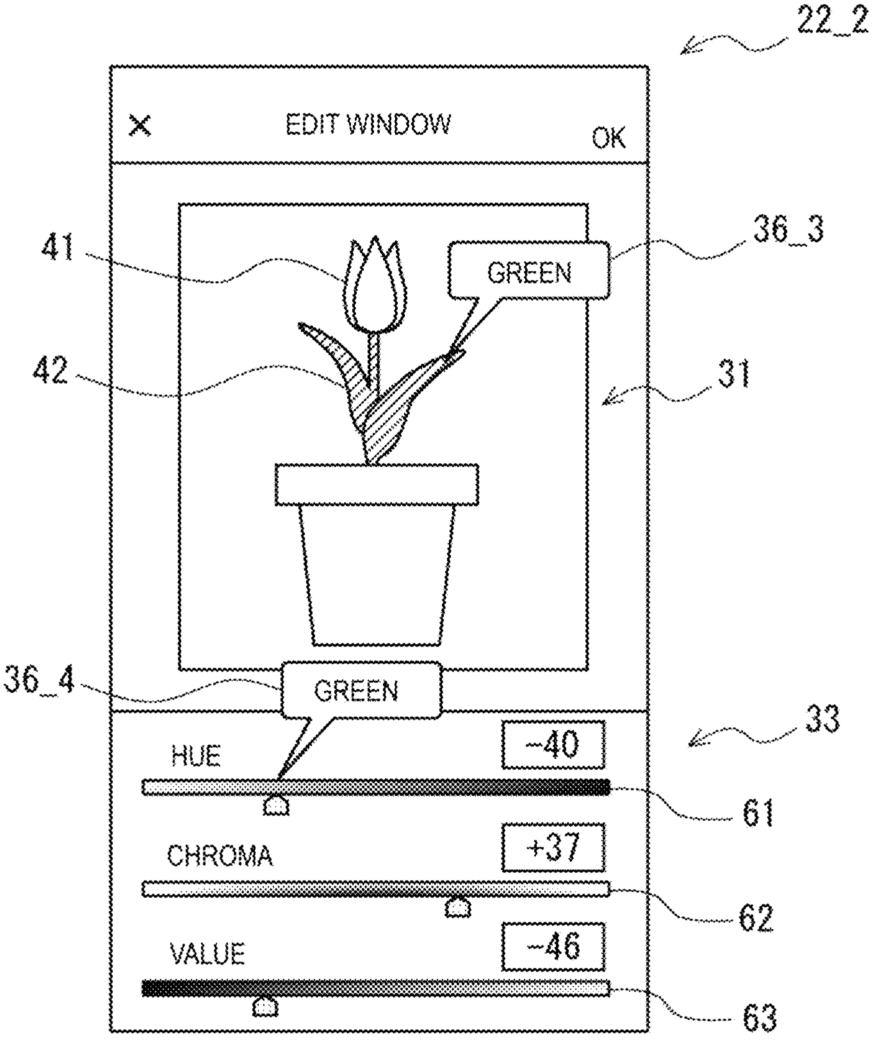
FIG. 5 shows a specific example of the edit window of the image processing apparatus according to the embodiment.
Figure 6:
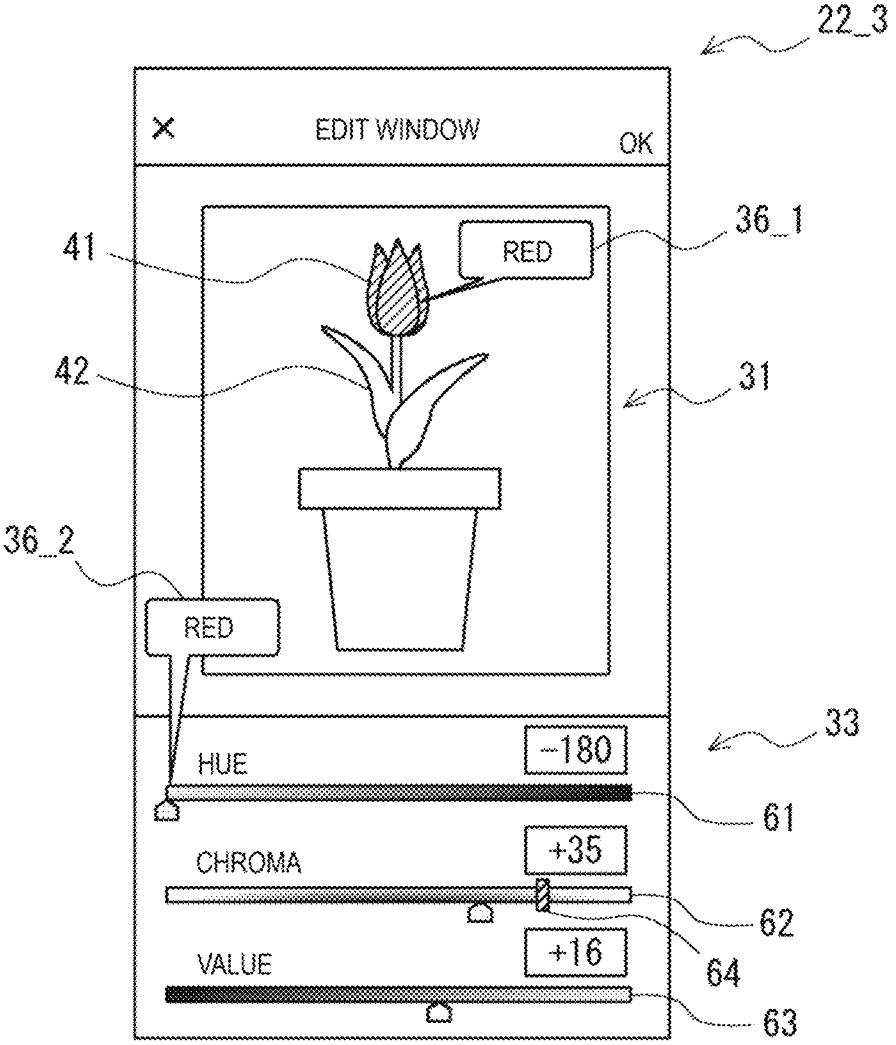
FIG. 6 shows a specific example of the edit window of the image processing apparatus according to the embodiment.

In the example shown in FIGS. 4 to 6, the edit tool 33 includes tuning bars 61 to 63 for tuning of the hue, the chroma, and the value. The receiving unit 13 receives an instruction to tune the specific colors input by the user operating the tuning bars 61 to 63. For example, when the image data is photo data, the image data may be edited more easily by tuning of the image data using the hue, the chroma, and the value familiar to the sense of vision of a human. For example, HSV formed by conversion of RGB into value, chroma, hue may be used, however, Lch formed by conversion of Lab closer to the sense of human into value, chroma, hue may be used. The image data may be easily edited using these various color spaces.

For example, the tuning of value and contrast and the tuning of chroma can be automatically calculated by an analysis of a histogram or gamut, however, when the tuning does not appeal to one's taste, fine tuning is necessary. In addition, regarding the hue, with respect to colors called memory colors such as a color of sky and a color of skin of a human, a hue value having the highest statistical probability of appearance and the most preferred hue value are known from results of academic research, and automatic processing can be performed by setting of those values. However, for drastic change of the hue, for example, for edit to change a red flower into a blue flower, manual tuning is necessary. In this case, the image data may be easily edited using the tuning bars 61 to 63 for tuning of the hue, the chroma, and the value.

The hue tuning bar 61 shows hue by one-dimensional gradation and the hue changes in the leftward and rightward directions. In the hue tuning bar 61, the hue can be tuned in a range from −180 degrees to +180 degrees. In the chroma tuning bar 62, the chroma is reduced toward the leftward direction and the chroma is increased toward the rightward direction. In the chroma tuning bar 62, the chroma can be tuned in a range from −100% to +100%. In the value tuning bar 63, the value is reduced toward the leftward direction and the value is increased toward the rightward direction. In the value tuning bar 63, the value can be tuned in a range from −100% to +100%.

As shown in FIG. 4, the image data 31 to be edited includes the red petals 41 and the green leaves 42 and, when the type of the color weakness of the user is the P-type or the D-type, it is hard for the user to distinguish the color of the petals 41 and the color of the green leaves 42. In this case, in the embodiment, when the image data 31 and the edit tool 33 are displayed, pixels of the colors of red and green as the specific colors are distinguishably displayed.

For example, as shown in FIGS. 4 and 5, a tooltip 36_2 showing color information of red and a tooltip 36_4 showing color information of green are displayed in the hue tuning bar 61. For the names of color information, e.g., JIS custom color names may be used. When the user is a color-weak person, distinction of the colors in the hue directions is hard, therefore, as shown in FIGS. 4, 5, tooltips of a combination of colors hard for the user to distinguish are displayed in the hue tuning bar 61. On the other hand, the tuning bars 62, 63 are the tuning bars for chroma and value and the user can recognize the value and the chroma, therefore it is not necessary to display tooltips showing the color information in the tuning bars 62, 63. Note that, in consideration of the convenience of the user, tooltips showing the color information may be displayed in the tuning bars 62, 63.

For example, as shown in FIG. 4, when the user selects the position of red in the hue tuning bar 61, the display unit 12 displays the tooltip 36_2 showing the color information of red in the hue tuning bar 61. Here, the display unit 12 distinguishably displays the red part contained in the image data 31, i.e., the part of the petals 41. For example, the display unit 12 may display the pixels of the part of the petals 41 with blinking. Or, the display unit 12 may display the pixels of the part of the petals 41 by surrounding an area containing the pixels with a line. In FIG. 4, as an example, the part of the petals 41 is shown with hatching. Further, the unit may display a tooltip 36_1 showing the color information of red in the part of the petals 41. Note that, in the embodiment, the tooltip may be displayed and the color information may be read by voice.

Furthermore, as shown in FIG. 5, when the user selects the position of green in the hue tuning bar 61, the display unit 12 displays the tooltip 36_4 showing the color information of green in the hue tuning bar 61. Here, the display unit 12 distinguishably displays the green part contained in the image data 31, i.e., the part of the leaves 42. For example, the display unit 12 may display the pixels of the part of the leaves 42 with blinking. Or, the display unit 12 may display the pixels of the part of the leaves 42 by surrounding an area containing the pixels with a line. In FIG. 5, as an example, the part of the leaves 42 is shown with hatching. Note that, in FIG. 5, the color of the stem is also green and the part of the stem is shown with hatching. Further, the unit may display a tooltip 36_3 showing the color information of green in the part of the leaves 42.

Further, in the embodiment, as shown in FIG. 6, a mark 64 showing an aim of the tuning of chroma may be displayed on the tuning bar 62. For example, the mark 64 showing an aim of the tuning is explained. When the chroma is tuned, a request to make the image more brilliant is often made, therefore the chroma is often extended. However, if the chroma is extended without any consideration, gradation data placed spatially is saturated to the same hue value and gradation collapse occurs. Accordingly, it is understood that an optimal appropriate chroma extension point exists. The aim of tuning is the maximum chroma extension point at which the chroma may be extended to the maximum without gradation collapse. As described above, the mark 64 showing the aim of the tuning of chroma is displayed on the tuning bar 62, and thereby, even a color-weak person may easily perform tuning of chroma.

Furthermore, in the embodiment, the tooltip 36_2 showing the color information of red and the tooltip 36_4 showing the color information of green may be displayed at the same time in the hue tuning bar 61 shown in FIGS. 4, 5.

Figure 7:
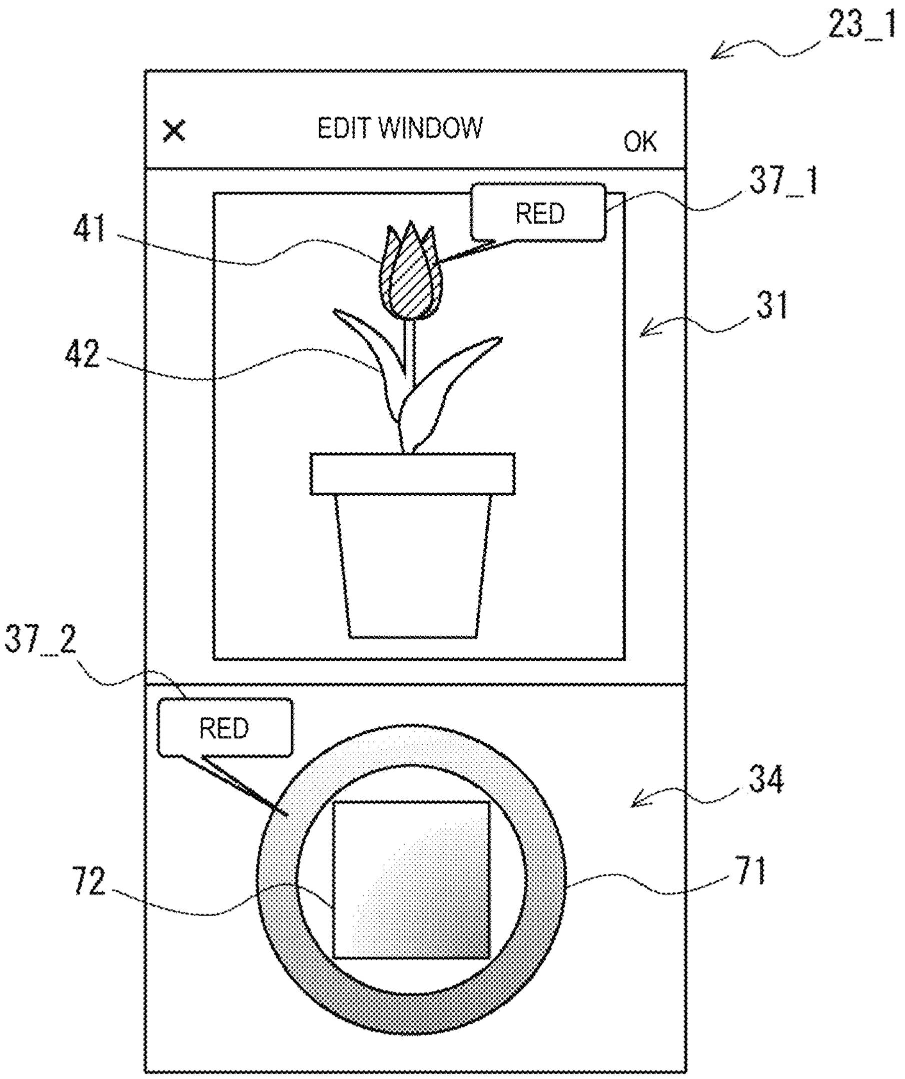
FIG. 7 shows a specific example of an edit window of the image processing apparatus according to the embodiment.
Figure 8:
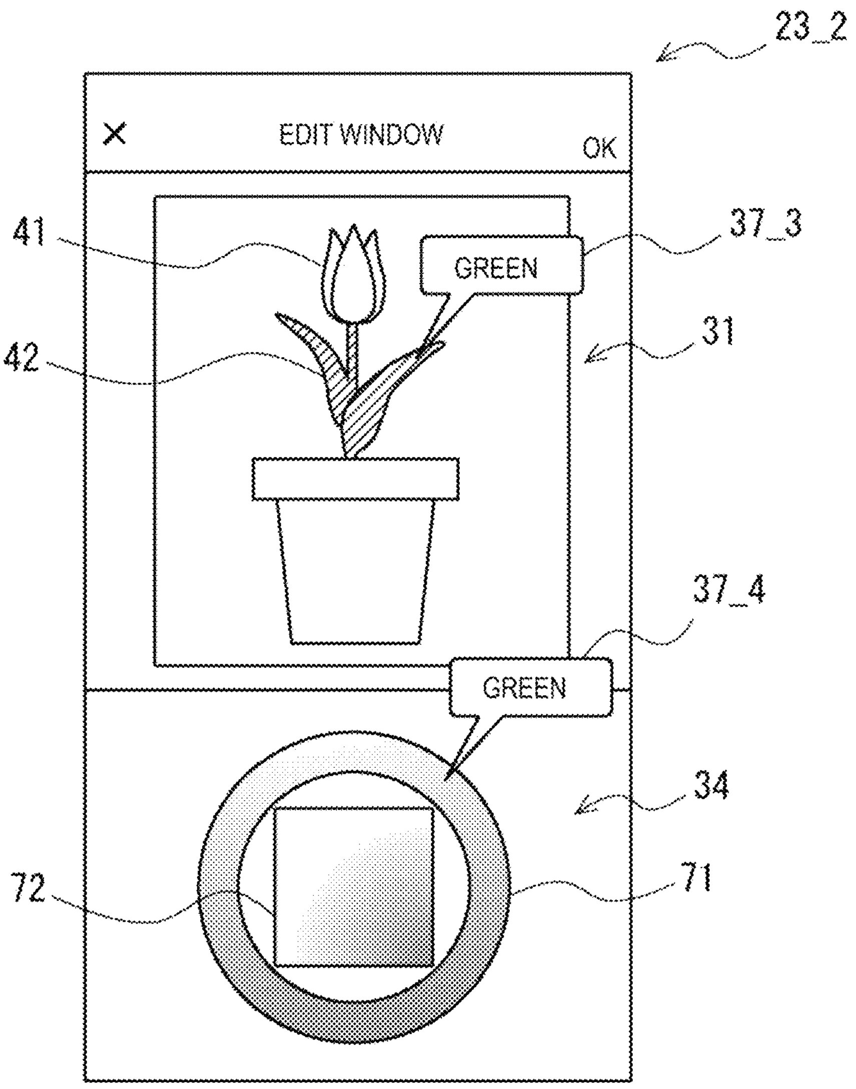
FIG. 8 shows a specific example of the edit window of the image processing apparatus according to the embodiment.

In the example shown in FIGS. 7, 8, the edit tool 34 includes a circular hue circle 71 for tuning of hue and a two-dimensional palette 72 in which value and chroma change within the same hue. The receiving unit 13 receives an instruction to tune a specific color within the color space input by the user operating the hue circle 71 and the two-dimensional palette 72.

The hue circle 71 represents hues by circular gradation and the hue changes in rotation directions. The two-dimensional palette 72 represents the value and the chroma in the hue selected in the hue circle 71 by gradation. In the two-dimensional palette 72, the gradation of the chroma is shown in the lateral directions, and a more achromatic color is shown toward the leftward direction and a higher chroma color is shown toward the rightward direction. The gradation of the value is shown in the longitudinal directions of the two-dimensional palette 72.

As shown in FIGS. 7, 8, the image data 31 to be edited includes the red petals 41 and the green leaves 42 and, when the type of the color weakness of the user is the P-type or the D-type, it is hard for the user to distinguish the color of the petals 41 and the color of the green leaves 42. In this case, in the embodiment, when the image data 31 and the edit tool 34 are displayed, pixels of the colors of red and green as the specific colors are distinguishably displayed.

For example, as shown in FIGS. 7 and 8, a tooltip 37_2 showing color information of red and a tooltip 37_4 showing color information of green are displayed in the hue circle 71. For the names of color information, e.g., JIS custom color names may be used. When the user is a color-weak person, distinction of the colors in the hue directions is hard, therefore, as shown in FIGS. 7, 8, tooltips of a combination of colors hard for the user to distinguish are displayed in the hue circle 71. On the other hand, the two-dimensional palette 72 shows the value and the chroma in the hue selected in the hue circle 71 and the user can recognize the value and the chroma, so that it is not necessary to display a tooltip showing the color information in the two-dimensional palette 72. Note that, in consideration of the convenience of the user, a tooltip showing the color information may be displayed in the two-dimensional palette 72.

For example, as shown in FIG. 7, when the user selects the position of red in the hue circle 71, the display unit 12 displays the tooltip 37_2 showing the color information of red in the hue circle 71. Here, the display unit 12 distinguishably displays the red part contained in the image data 31, i.e., the part of the petals 41. For example, the display unit 12 may display the pixels of the part of the petals 41 with blinking. Or, the display unit 12 may display the pixels of the part of the petals 41 by surrounding an area containing the pixels with a line. In FIG. 7, as an example, the part of the petals 41 is shown with hatching. Further, the unit may display a tooltip 37_1 showing the color information of red in the part of the petals 41. Note that, in the embodiment, the tooltip may be displayed and the color information may be read by voice.

Or, as shown in FIG. 8, when the user selects the position of green in the hue circle 71, the display unit 12 displays the tooltip 37_4 showing the color information of green in the hue circle 71. Here, the display unit 12 distinguishably displays the green part contained in the image data 31, i.e., the part of the leaves 42. For example, the display unit 12 may display the pixels of the part of the leaves 42 with blinking. Or, the display unit 12 may display the pixels of the part of the leaves 42 by surrounding an area containing the pixels with a line. In FIG. 8, as an example, the part of the leaves 42 is shown with hatching. Note that, in FIG. 8, the color of the stem is also green and the part of the stem is shown with hatching. Further, the unit may display a tooltip 37_3 showing the color information of green in the part of the leaves 42.

Furthermore, in the embodiment, the tooltip 37_2 showing the color information of red and the tooltip 37_4 showing the color information of green may be displayed at the same time in the hue circle 71 shown in FIGS. 7, 8.

In the above described specific examples of the edit windows, the case where the type of color weakness of the user is the P-type or the D-type is explained, however, the present disclosure according to the embodiment may be applied to a case where the type of color weakness of the user is the T-type in the same manner. That is, when the type of color weakness of the user is the T-type, tooltips of a combination of colors hard for the user to distinguish, i.e., bluish and yellowish colors are displayed in the image data 31 and the edit tools 32 to 34.

Further, in the embodiment, the display unit 12 may place colors for which color information is displayed by tooltips at a center part side of the hue bar and place colors for which color information is not displayed by tooltips at an end part side of the hue bar. For example, in the hue tuning bar 61 shown in FIG. 4, hues of red and green may be placed at the center part side. By the placement, the tooltips may be placed at the center side of the tuning bar 61 and the user may be easily visually recognized.

As described above, in the embodiment, when displaying image data, the display unit 12 distinguishably displays the pixels corresponding to the specific colors within the color space according to the type of the color weakness of the user. Specifically, when the type of the color weakness of the user is the P-type or the D-type, with the reddish and greenish colors as specific colors, the display unit 12 distinguishably displays the pixels corresponding to the specific colors when displaying image data. Or, when the type of the color weakness of the user is the T-type, with the bluish and yellowish colors as specific colors, the display unit 12 distinguishably displays the pixels corresponding to the specific colors when displaying image data. Therefore, the image processing apparatus that enables even a color-weak person to easily edit image data may be provided. The description of the specific colors is "red" and "green" in the specification, however, not limited to those. As is well known, there are individual differences between color names and color recognitions. For example, regarding a stimulus having one spectral distribution, some recognizes as "red" and some recognizes as "orange", and, as an embodiment, the color may be described as "orange" in place of "red". Further, the number of types of information on color weakness, names of the types, whether the types and grades of color weakness are separately handled or collectively handled, etc. may be appropriately set, however, desirably set based on the medical knowledge.

Note that, in the embodiment, a program that enables execution of the above-described operations may be executed by a computer. That is, a program that enables execution of image processing including a step of acquiring image data, a step of displaying the acquired image data, a step of receiving an instruction to edit the displayed image data from a user, and a step of outputting the image data edited according to the instruction by the user, and distinguishably displaying pixels corresponding to a specific color within a color space according to information on color weakness of the user may be executed by a computer.

For example, the computer includes a processor and a memory. In the memory, the program that enables execution of the above-described operations is stored. The processor reads out the program from the memory. Then, the program is executed in the processor, and thereby, the above-described image processing may be executed.

As above, the present disclosure is explained according to the above-described embodiment, however, the present disclosure is not limited to the configuration of the above-described embodiment and obviously includes various modifications, alterations, combinations that could be made by a person skilled in the art within the scope of the present disclosure in claims of What is Claimed is of the application.

What is claimed is:

1. An image processing apparatus comprising:

a processor;

a memory storing a program for the processor to execute an image processing;

the processor reading out the program and executing the image processing including acquiring image data, receiving information on color weakness of a user, displaying, in a single edit window, the image data and an edit tool screen, receiving an instruction to tone a specific color via the edit tool screen from the user, distinguishably displaying pixels corresponding the specific color in the image data displayed in the single edit window, according to the information on color weakness of the user, receiving an instruction to edit the image data from the user after displaying distinguishably the pixels, and outputting the image data edited according to the instruction by the user.

2. The image processing apparatus according to claim 1, wherein the instruction to tune the specific color is an instruction to tune at least one of hue, chroma, and value.

3. The image processing apparatus according to claim 1, wherein the processor receives a type and a grade of color weakness of the user, and the processor distinguishably displays the pixels corresponding to the specific color according to the type and the grade of the color weakness of the user.

4. The image processing apparatus according to claim 3, wherein the processor receives the information on the color weakness of the user using a test pattern that specifies the type of the color weakness of the user.

5. The image processing apparatus according to claim 1, wherein the processor distinguishably displays the pixels corresponding to the specific color, according to the instruction to tone the specific color that is hard for the user to distinguish and is determined based on the information on the color weakness of the user, and, even when a pixel corresponding to a color distinguishable by the user determined based on the information of the color weakness of the user is designated, the processor maintains display same as display for a non color blind person with respect to the pixel.

6. The image processing apparatus according to claim 1, wherein when distinguishably displaying the pixels corresponding to the specific color according to the information on the color weakness of the user, the processor displays the pixels corresponding to the specific color with blinking.

7. The image processing apparatus according to claim 1, wherein when distinguishably displaying the pixels corresponding to the specific color according to the information on the color weakness of the user, the processor displays the pixels corresponding to the specific color by surrounding an area containing the pixels with a line.

8. The image processing apparatus according to claim 1, wherein the processor distinguishably displays the pixels corresponding to the specific color according to the information on the color weakness of the user and displays color information of the specific color on the pixels corresponding to the specific color by a tooltip.

9. The image processing apparatus according to claim 8, wherein, when the specific color includes a plurality of specific colors, the processor displays tooltips corresponding to the plurality of specific colors, respectively, in the single edit window.

10. The image processing apparatus according to claim 1, wherein the processor is configured to receive a designation of a color via an edit tool in the edit tool screen, and the processor displays color information on a color of the edit tool according to the information on the color weakness of the user by a tooltip.

11. The image processing apparatus according to claim 10, wherein the edit tool includes a one-dimensional hue bar for turning of hue, and the processor places a color for which color information is displayed by the tooltip at a center part side of the hue bar and places a color for which color information is not displayed by the tooltip at an end part side of the hue bar.

12. The image processing apparatus according to claim 1, wherein when the type of the color weakness of the user is a P (Protanope)-type or a D (Deuteranope)-type, with reddish and greenish colors as the specific colors, the processor distinguishably displays the pixels corresponding to the specific colors when displaying the image data.

13. The image processing apparatus according to claim 1, wherein when the type of the color weakness of the user is a T (Tritanope)-type, with bluish and yellowish colors as the specific colors, the processor distinguishably displays the pixels corresponding to the specific colors when displaying the image data.

14. An image processing method comprising:

acquiring image data;

receiving information on color weakness of a user, displaying, in a single edit window, the image data and an edit tool screen;

receiving an instruction to tone a specific color via the edit tool screen from the user;

distinguishably displaying pixels corresponding the specific color in the image data displayed in the single edit window, according to the information on color weakness of the user;

receiving an instruction to edit the image data from the user after displaying distinguishably the pixels; and outputting the image data edited according to the instruction by the user.

15. A non-transitory computer-readable storage medium storing a program for a computer to execute image processing comprising:

acquiring image data;

receiving information on color weakness of a user;

displaying, in a single edit window, the image data and an edit tool screen;

receiving an instruction to tone a specific color via the edit tool screen from the user;

distinguishably displaying pixels corresponding the specific color in the image data displayed in the single edit window, according to the information on color weakness of the user;

receiving an instruction to edit the image data from the user after displaying distinguishably the pixels;

outputting the image data edited according to the instruction by the user.

* * * * *